(12) United States Patent  
Schacherer et al.

(10) Patent No.: US 8,342,412 B2  
(45) Date of Patent: *Jan. 1, 2013

(54) TRANSACTION PRODUCT WITH ELECTRICAL CIRCUIT

(75) Inventors: Mike Schacherer, St. Louis Park, MN (US); Timothy P. Clegg, Manhatten Beach, CA (US); Primoz Samardzija, Marina del Ray, CA (US); Ted C. Halbur, Lino Lakes, MN (US)

(73) Assignee: Target Brands, Inc., Minneapolis, MN (US)

( * ) Notice: Subject to any disclaimer, the term of this patent is extended or adjusted under 35 U.S.C. 154(b) by 195 days.

This patent is subject to a terminal disclaimer.

(21) Appl. No.: 12/900,881

(22) Filed: Oct. 8, 2010

(65) Prior Publication Data

US 2011/0024498 A1      Feb. 3, 2011

Related U.S. Application Data

(63) Continuation of application No. 11/932,003, filed on Oct. 31, 2007, now Pat. No. 7,815,108.

(51) Int. Cl.  
*G06K 19/00* (2006.01)

(52) U.S. Cl. ........ 235/487; 235/380; 235/492; 235/493; 84/5; 84/25; 446/143; 705/17; 705/39; 705/44

(58) Field of Classification Search .......... 235/380, 235/487, 492, 488, 493; 84/25; 446/143; 40/124, 717; 705/17, 39, 44

See application file for complete search history.

(56) References Cited

U.S. PATENT DOCUMENTS

| 3,351,268 A | 11/1967 | Schroeder |
| 3,376,778 A | 4/1968 | Musser |
| 3,562,394 A | 2/1971 | Kiepe |
| 3,592,098 A | 7/1971 | Zadig |
| 4,299,041 A | 11/1981 | Wilson |
| 4,614,144 A | 9/1986 | Sagara et al. |
| 4,706,536 A | 11/1987 | Sanders |

(Continued)

FOREIGN PATENT DOCUMENTS

GB         2277482 A         11/1994

OTHER PUBLICATIONS

"Credit Union tech-talk," http://www.cunews.com/newsletters/2004419.htm, Apr. 19, 2004, 8 pages.

*Primary Examiner* — Michael G Lee  
*Assistant Examiner* — Tabitha Chedekel  
(74) *Attorney, Agent, or Firm* — Griffiths & Seaton PLLC

(57) ABSTRACT

A transaction product includes an enclosure, an account identifier and an electrical circuit. The enclosure defines an aperture. The account identifier is at least one of connected to or enclosed within the enclosure and links the transaction product to an account or record. The account identifier is machine readable. The electrical circuit includes a flexible circuit member, wherein the flexible circuit member extends through the aperture defined by the enclosure such that a first portion of the flexible circuit member is coupled to an outside surface of the enclosure and a second portion of the flexible circuit member is positioned inside the enclosure. Other cards, products, assemblies and methods of using such cards, products and assemblies are also disclosed.

20 Claims, 12 Drawing Sheets

U.S. PATENT DOCUMENTS

| | | |
|---|---|---|
| 4,752,230 A | 6/1988 | Shimizu |
| 4,791,741 A | 12/1988 | Kondo |
| 4,794,840 A | 1/1989 | Isashi |
| 4,830,618 A | 5/1989 | David |
| D305,887 S | 2/1990 | Nishimura |
| 5,063,698 A | 11/1991 | Johnson et al. |
| 5,275,285 A | 1/1994 | Clegg |
| 5,359,374 A | 10/1994 | Schwartz |
| 5,387,108 A | 2/1995 | Crowell |
| 5,539,819 A | 7/1996 | Sonoyama et al. |
| 5,577,918 A | 11/1996 | Crowell |
| 5,641,164 A | 6/1997 | Doederlein et al. |
| 5,774,861 A | 6/1998 | Spector |
| 5,778,574 A | 7/1998 | Reuben |
| 5,920,096 A | 7/1999 | Lee |
| 6,019,284 A | 2/2000 | Freeman et al. |
| 6,028,752 A | 2/2000 | Chomette et al. |
| 6,068,183 A | 5/2000 | Freeman et al. |
| D429,733 S | 8/2000 | Jones et al. |
| 6,099,043 A | 8/2000 | Story |
| D436,991 S | 1/2001 | Morgante |
| 6,259,006 B1 | 7/2001 | Parienti |
| 6,356,626 B1 | 3/2002 | Ohara et al. |
| 6,402,039 B1 | 6/2002 | Freeman et al. |
| 6,607,136 B1 | 8/2003 | Atsmon et al. |
| D490,837 S | 6/2004 | Chang |
| 6,894,211 B2 | 5/2005 | Asahi |
| 7,815,108 B2 * | 10/2010 | Schacherer et al. .......... 235/380 |
| 2002/0017759 A1 | 2/2002 | McClung, III et al. |
| 2002/0066789 A1 | 6/2002 | Yen |
| 2002/0143697 A1 | 10/2002 | Gotfried |
| 2002/0169608 A1 | 11/2002 | Tamir et al. |
| 2003/0022586 A1 | 1/2003 | Beged-Dov |
| 2003/0132300 A1 | 7/2003 | Dilday et al. |
| 2003/0155425 A1 | 8/2003 | Lynch |
| 2004/0028235 A1 | 2/2004 | Pan |
| 2004/0032732 A1 | 2/2004 | Rubin |
| 2004/0055188 A1 | 3/2004 | Dolan-King |
| 2004/0238625 A1 | 12/2004 | Walker et al. |
| 2005/0236490 A1 | 10/2005 | Fortune et al. |
| 2006/0157555 A1 | 7/2006 | Dean et al. |
| 2006/0157556 A1 | 7/2006 | Halbur et al. |
| 2006/0161439 A1 | 7/2006 | Selg et al. |
| 2007/0289431 A1 | 12/2007 | Hammond |

* cited by examiner

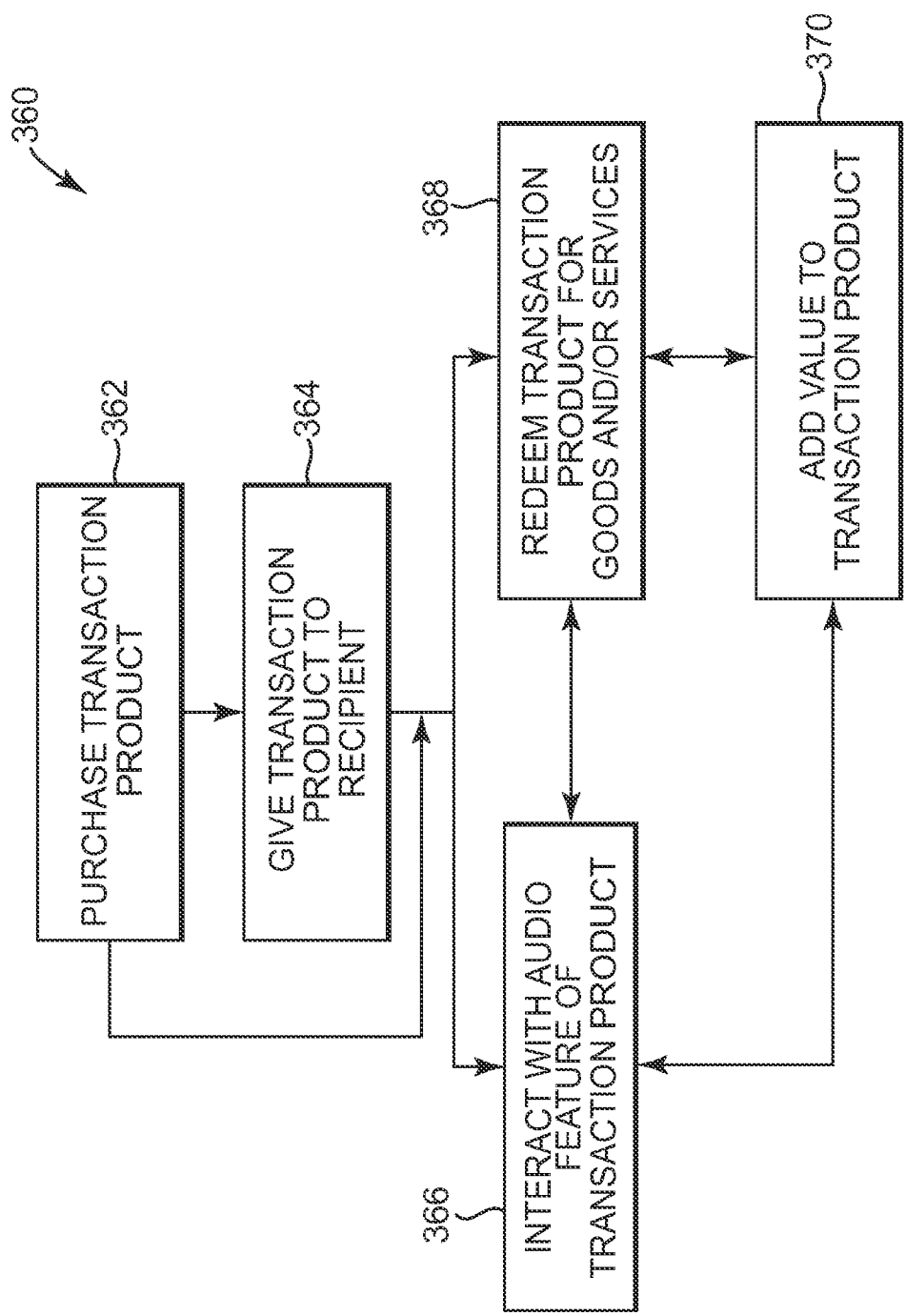

TRANSACTION PRODUCT WITH ELECTRICAL CIRCUIT

CROSS-REFERENCE TO RELATED APPLICATION

The present application is a continuation of U.S. application Ser. No. 11/932,003, filed Oct. 31, 2007, now U.S. Pat. No. 7,815,108, issued Oct. 19, 2010, which is incorporated herein by reference.

BACKGROUND OF THE INVENTION

Stored-value cards and other transaction cards come in many forms. A gift card, for example, is a type of stored-value card that includes a pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction cards provide a number of advantages to both the consumer and the retailer.

SUMMARY OF THE INVENTION

One aspect of the present invention relates to a transaction product including an enclosure, an account identifier and an electrical circuit. The enclosure defines an aperture. The account identifier is at least one of connected to or enclosed within the enclosure and links the transaction product to an account or record. The account identifier is machine readable. The electrical circuit includes a flexible circuit member, wherein the flexible circuit member extends through the aperture defined by the enclosure such that a first portion of the flexible circuit member is coupled to an outside surface of the enclosure and a second portion of the flexible circuit member is positioned inside the enclosure. Other related products and methods are also disclosed and provide additional advantages.

BRIEF DESCRIPTION OF THE DRAWINGS

Embodiments of the invention will be described with respect to the figures, in which like reference numerals denote like elements, and in which:

FIG. 14 is a flow chart illustrating a method of using a transaction product, according to one embodiment of the present invention.

DETAILED DESCRIPTION

The following detailed description merely provides examples of the invention and is not intended to limit the invention or the application and uses of the invention. Furthermore, there is no intention to be bound by any theory presented in the preceding background of the invention or the following detailed description of the invention.

A gift card or other transaction product is adapted for making purchases of goods and/or services from e.g., a retail store or website. According to one embodiment, an original consumer buys the transaction product to give a recipient who in turn is able to use the transaction product at a retail store or setting to pay for goods and/or services. The transaction product, according to embodiments of the present invention, provides the consumer and recipient with extra functionality in addition to the ability to pay for goods and/or services with the transaction product. In particular, the transaction product presents the original consumer and/or other bearer of the transaction product with an additional, non-transaction functionality such as variable audio output based upon input from a bearer of the transaction product.

More specifically, in one example, the transaction product functions as an electronic piano. As such, the transaction product defines a plurality of keys and includes an electronic circuit. When a bearer of the transaction product presses or otherwise interacts with one of the keys, the transaction product emits an audio note or tone linked to the pressed one of the keys. In one example, the keys are arranged in a linear row and a note associated with each individual key is higher than a note associated with any of the keys to the left of the individual key. In one embodiment, at least seven keys are provided and each key is associated with a different one of the seven notes of a C major musical scale. As such, the bearer of the transaction product is able to play music on the transaction product simply by pressing the keys in a desired sequence, which causes the transaction product to emit a sequence of corresponding notes similar to an actual piano. In one embodiment, the non-transactional functionality, which, in one example is an audio functionality, of the transaction product provides amusement to the bearer of the transaction product and promotes purchase of the transaction product.

Figure 6:
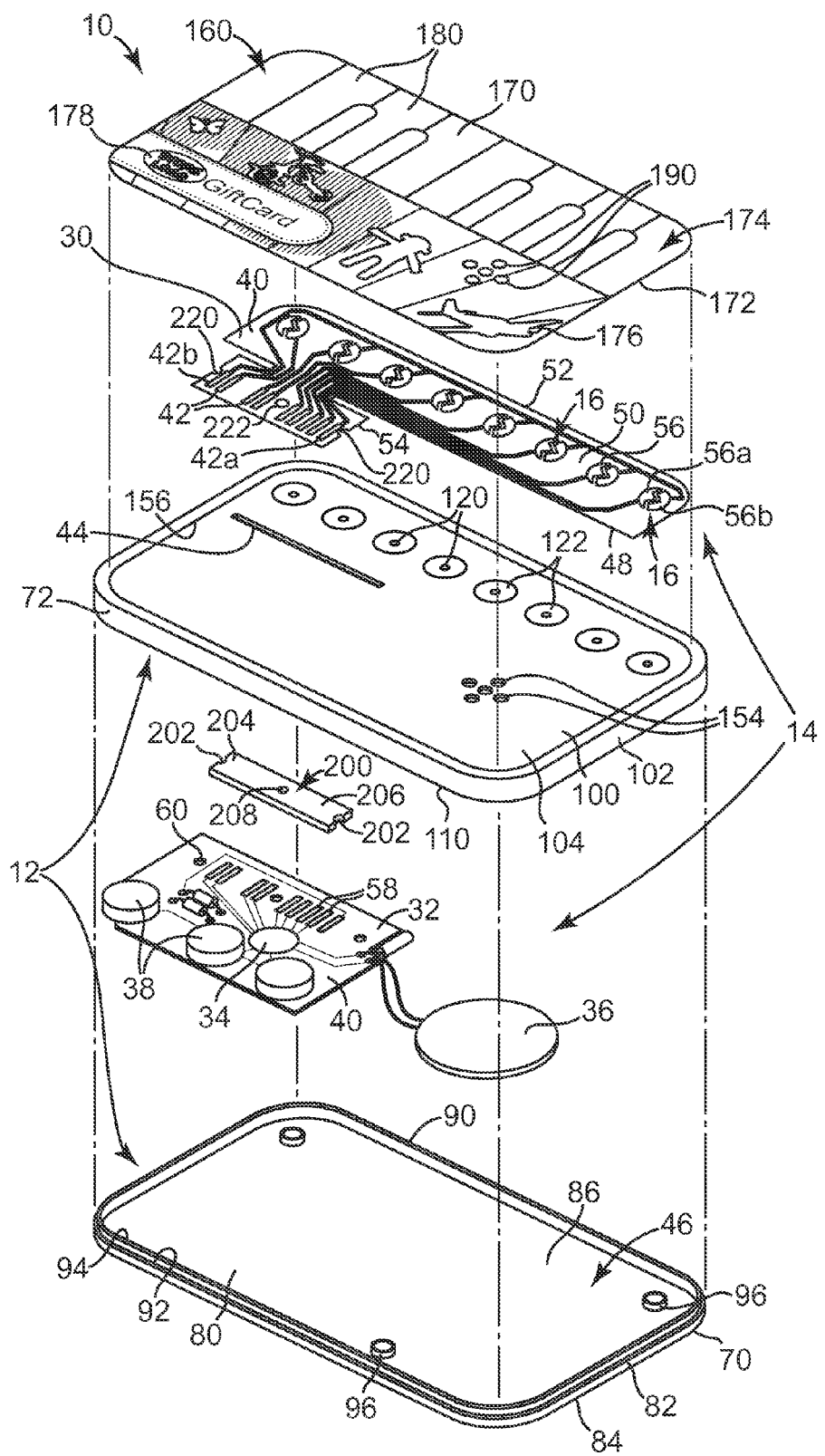
FIG. 6 is an exploded, perspective view illustration of the transaction product of FIG. 1, according to one embodiment of the present invention.

Turning to the figures, FIGS. 1-6 illustrate one embodiment of a transaction product 10 such as a stored-value product (e.g., gift card, phone card, etc.), credit product, etc. according to the present invention. Transaction product 10 is configured to be used toward the purchase and/or use of goods and/or services and includes an enclosure or housing 12 or other support structure and an electrical circuit 14 (FIG. 6). In one embodiment, electrical circuit 14 is at least partially enclosed within housing 12 and includes at least one, and, in one example, a plurality of electrical switches 16 (FIG. 6) each associated with a different audible note or tone stored to electrical circuit 14. Upon user interaction with an individual one of switches 16 (e.g., by pressing one of switches 16), electrical circuit 14 is activated to perform a non-transactional function, for example, to automatically emit the audio note associated with the pressed one of switches 16. In one embodiment, the arrangement of switches 16 and the order the corresponding notes are associated therewith allows transaction product 10 to function similarly to a portion of a piano.

Transaction product 10 includes an account identifier 20 (FIG. 3) such as a bar code, magnetic strip, a smart chip or other electronic device, a radio frequency identification (RFID) device or other suitable identifier readily machine readable by a point-of-sale terminal or other account access station or kiosk. Account identifier 20 indicates an account or record to which transaction product 10 is linked. The account or record of the monetary or other balance on transaction product 10 optionally is maintained on a database, other electronic or manual record-keeping system or, in the case of "smart" cards for example, on a chip or other electronic devices on transaction product 10 itself. Accordingly, by scanning account identifier 20, the account or record linked to transaction product 10 is identified and can subsequently be activated, have amounts debited therefrom and/or have amounts added thereto.

In one embodiment, account identifier 20 includes a character string or code 22 (e.g., a number and/or letter string) configured to provide additional security to the user of transaction product 10 and/or configured to be read by a bearer of transaction product 10 to facilitate use of transaction product 10 for web site or other purchases outside of brick-and-mortar type retail establishments. With the above in mind, account identifier 20 is one example of means for linking transaction product 10 with an account or record, and scanning of account identifier 20 is one example of means for activating or loading value on transaction product 10.

Referring to the exploded perspective view of FIG. 6, electrical circuit 14 includes a flexible circuit member 30, a printed circuit board (PCB) 32, a controller 34, a speaker 36 and one or more power sources 38. In one embodiment, flexible circuit member 30 includes switches 16 and extends from a position external to housing 12 into housing 12. Within housing 12, flexible circuit member 30 is positioned in electrical communication with PCB 32 such that signals from switches 16 can be electrically communicated to controller 34, which is mounted on PCB 32. Speaker 36 is in electrical communication with controller 34, such that speaker 36 will emit a desired audio tone or note based on instructions from controller 34. Power sources 38 are configured to provide power to controller 34, speaker 36 and/or any other component of electrical circuit 14 necessary to provide full functionality of electrical circuit 14. In one embodiment, PCB 32 includes electrical traces, one or more resistors, one or more capacitors and/or any suitable number of other electrical components facilitating the proper function of electrical circuit 14 and/or electrical connection of electrical components mounted on PCB 32.

In one embodiment, flexible circuit member 30 includes a flexible membrane 40 printed with or otherwise including switches 16 and conductive pads 42. Membrane 40 is a generally non-conductive substrate having suitable flexibility to be partially folded and routed from a position external to housing 12 and through a slot or aperture 44 defined by housing 12 into an internal cavity 46 of housing 12. Membrane 40 defines a first surface 48 and a second surface 50 opposite first surface 48. First surface 48 includes switches 16 and conductive pads 42. In one embodiment, membrane 40 is one of transparent or translucent such that switches 16 and conductive pads 42 can be viewed from second surface 50 through membrane 40 as illustrated in FIG. 6. In one example, membrane 40 defines an external portion 52 and an internal portion 54. Switches 16 are formed on external portion 52 while conductive pads 42 are formed on internal portion 54.

More specifically, in one example, each switch 16 includes a pair of conductive contact members 56 including a first contact member 56a and a second contact member 56b spaced from (i.e., defining a space therebetween), but positioned relatively near to one another. First contact member 56a is electrically coupled to a first conductive pad 42a, which is not otherwise in electrical communication with any other switches 16 or second contact member 56b, via an electrical trace or other suitable electrical connector on flexible circuit member 30. Second contact member 56b is similarly electrically coupled with a second conductive pad 42b, where first conductive pad 42a and second conductive pad 42b are each a different one of conductive pads 42. Each of the other switches 16 is similarly formed and includes a first contact member 56a, which is in communication with a corresponding one of conductive pads 42 that is not coupled with another switch 16, and a second contact member 56b, which is in electrical communication with second conductive pad 42b that is coupled to all other switches 16. As such, conductive pads 42 number one more than switches 16.

In one example, PCB 32 includes contact pads 58 on a surface thereof. Each contact pad 58 is sized, spaced and/or otherwise configured to be placed in direct contact with or to otherwise be electrically coupled with a different one conductive pads 42 of flexible circuit member 30. Each contact pad 58 is also in electrical communication with controller 34, which is mounted to PCB 32. In one embodiment, PCB 32 defines one or more apertures 60 sized, shaped and positioned to receive features of housing 12, as will further be described below, to facilitate alignment, positioning and/or coupling of PCB 32 to housing 12 or other components of transaction product 10. Although primarily described herein as including a single PCB 32, upon reading this application, one of ordinary skill in the art will recognize that multiple printed circuit boards may be utilized wherein the multiple printed circuit boards and/or the components mounted thereon are electrically coupled to one another.

Figure 1:
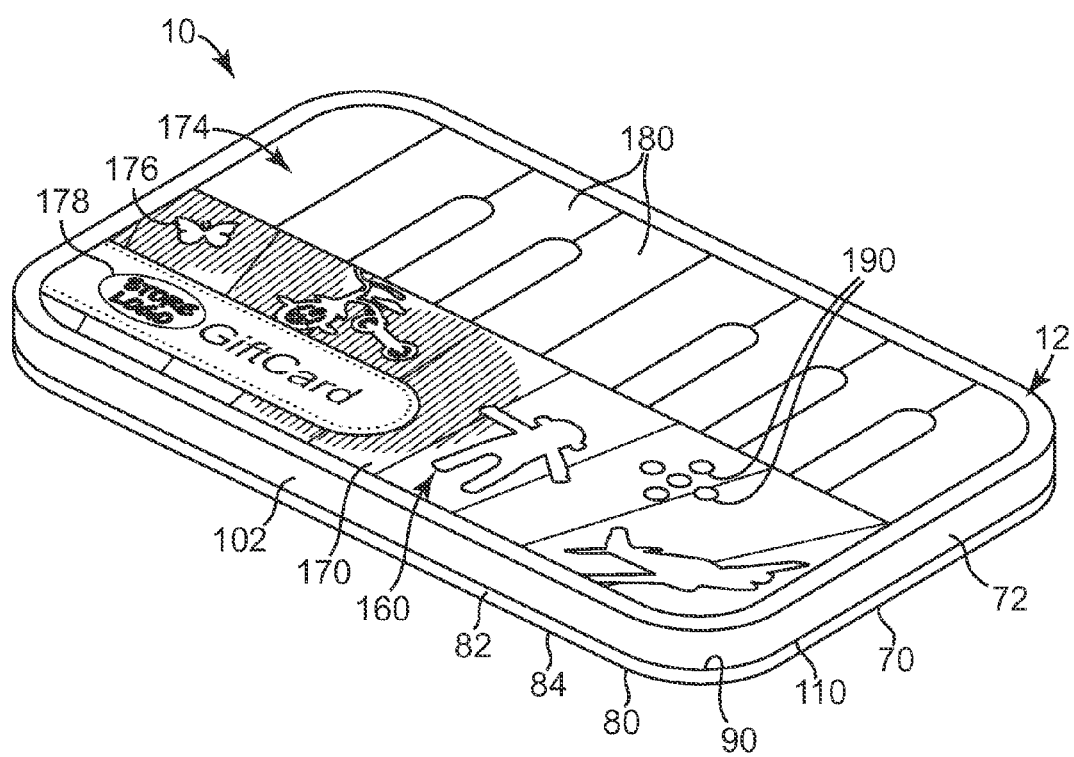
FIG. 1 is a perspective view illustration of a transaction product, according to one embodiment of the present invention.
Figure 2:
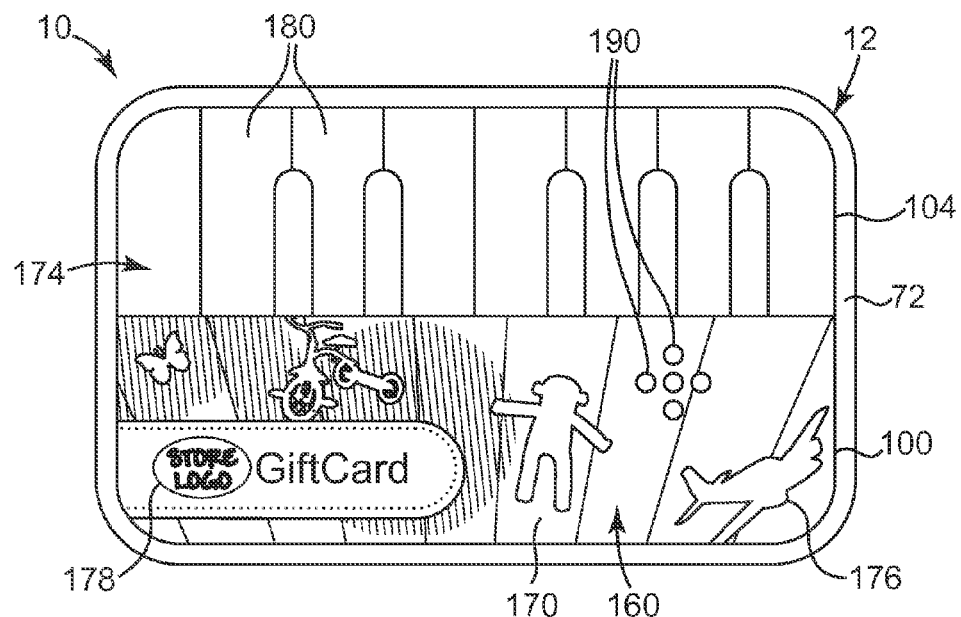
FIG. 2 is a front view illustration of the transaction product of FIG. 1, according to one embodiment of the present invention.
Figure 3:
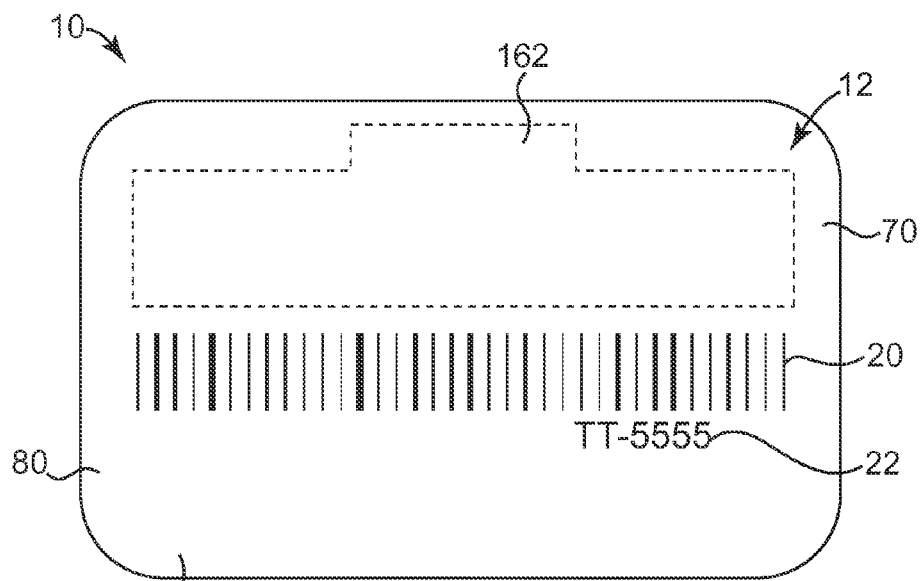
FIG. 3 is a rear view illustration of the transaction product of FIG. 1, according to one embodiment of the present invention.
Figure 4:
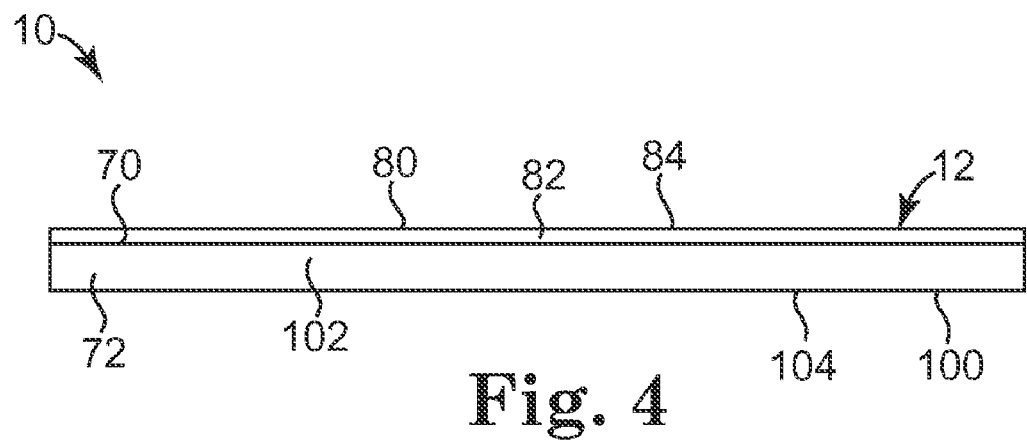
FIG. 4 is a top view illustration of the transaction product of FIG. 1, according to one embodiment of the present invention, wherein the bottom view is a mirror image thereof.
Figure 5:
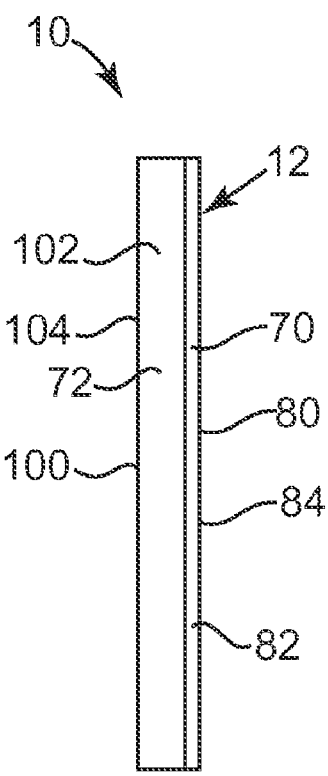
FIG. 5 is a right side view illustration of the transaction product of FIG. 1, according to one embodiment of the present invention, wherein the left side view is a mirror image thereof.

Controller 34 is any component or collection of components configured to receive electrical input from switches 16 and to output a corresponding electrical impulse to speaker 26, which will result in a desired tone being played by speaker 36. As such, controller 34 stores information relating to the tones or notes that transaction product is configured to produce and links each tone or note with a corresponding one of switches 16. In one embodiment, controller 34 links a plurality of notes with increasing frequency with one of switches 16 from the right to the left side of housing 12 as viewed in the orientation of FIG. 2 (notably, FIG. 2 presents the piano-like features of transaction product 10 upside down as compared to a typical piano orientation where frequency increase from left to right).

For instance, where controller 34 is configured to output electrical impulses corresponding with eight notes, each note is in the C-major scale with the first (lowest) and last (highest) note being a single octave apart (e.g., corresponding with C-major notes in the following increasing order F, G, A, B, C, D, E, and F) similar to the key layout and corresponding notes of a portion of a conventional piano keyboard. In one example, controller 34 is capable of producing electrical impulses configured to result in at least seven different notes within a singe octave. In view of the above, controller 34 is one example of means for assigning each of a plurality of user interfaces (e.g., keys 180 and switches 16) with a different one of a plurality of audible notes or tones.

Speaker 36 is any suitable speaker capable of converting electrical impulses from controller 34 into sound waves perceivable by the bearer of transaction product 10, e.g., the customer and/or recipient. In view of the above, electrical circuit 14 with speaker 36 is one example of means for outputting one or more of the plurality of audible tones or notes based upon user interaction with switches 16.

The one or more power sources 38 each provide electrical power to electrical circuit 14 including controller 34 and speaker 36. In one embodiment, each power source 38 is an alkaline battery or any other suitable battery. In one embodiment, during periods of non-use of electrical circuit 14, the amount of power provided by power sources(s) 38 to other components of electrical circuit 14 is decreased to prolong the overall functional life span of electrical circuit 14. Other variables in electrical circuit 14 will be apparent to those of skill in the art upon reading this application.

In one embodiment, housing 12 includes a first support or housing member 70 and a second support or housing member 72. In one embodiment, first housing member 70 is a base, and second housing member 72 is a cover. In one embodiment, base 70, as described with reference to FIGS. 3 and 6, generally includes a primary panel 80 and a side wall 82. Primary panel 80 is generally planar and defines an outside surface 84 (FIG. 3) and an inside surface 86 (FIG. 6) opposite outside surface 84. In one embodiment, primary panel 80 is generally rectangular and sized similar to an identification card, a credit card or other card sized to fit in a wallet of a user. In other embodiments, primary panel 80 is otherwise shaped as a square, circle, oval, star or any other suitable shape.

Side wall 82 extends from inside surface 86 away from outside surface 84 and, in one example, substantially about an entire perimeter of primary panel 80. In one embodiment, side wall 82 extends with a generally perpendicular orientation relative to primary panel 80. Side wall 82 extends from primary panel 80 to define an inside edge 90 (FIG. 6) opposite primary panel 80. In one example, inside edge 90 is formed as a stepped edge including a first portion 92 and a second portion 94. First portion 92 extends from primary panel 80 a smaller distance than second portion 94 extends from primary panel 80, as illustrated with reference to FIG. 6. In one example, first portion 92 extends generally about a perimeter of second portion 94. In this respect, inside edge 90 is formed as a stepped edge with the higher, second portion 94 being positioned just inside lower, first portion 92. In one embodiment, at least first portion 92 forms curved or chamfered corners at each corner, if any, defined by side wall 82.

In one embodiment, cylindrical protrusions 96 extend from inside surface 86 of primary panel 80 in a direction substantially parallel to side wall 82. In one example, each cylindrical protrusion 96 is at least partially hollow so as to receive a corresponding feature of cover 72, as will be further described below, to facilitate alignment and coupling of base 70 with cover 72. Other features configured to facilitate alignment and coupling of base 70 and cover 72 are also contemplated.

One embodiment of cover 72 is illustrated with reference to FIGS. 6 and 7. Cover 72 generally includes a primary panel 100 and a side wall 102. Primary panel 100 is generally planar and defines an outside surface 104 (FIG. 6) and an inside surface 106 (FIGS. 7-9) opposite outside surface 104. In one embodiment, primary panel 100 is generally sized similar to primary panel 80 of base 70. Side wall 102 extends from inside surface 106 about a substantial entirety of a perimeter of primary panel 100. For example, side wall 102 extends with a generally perpendicular orientation relative to primary panel 100.

Figure 8:
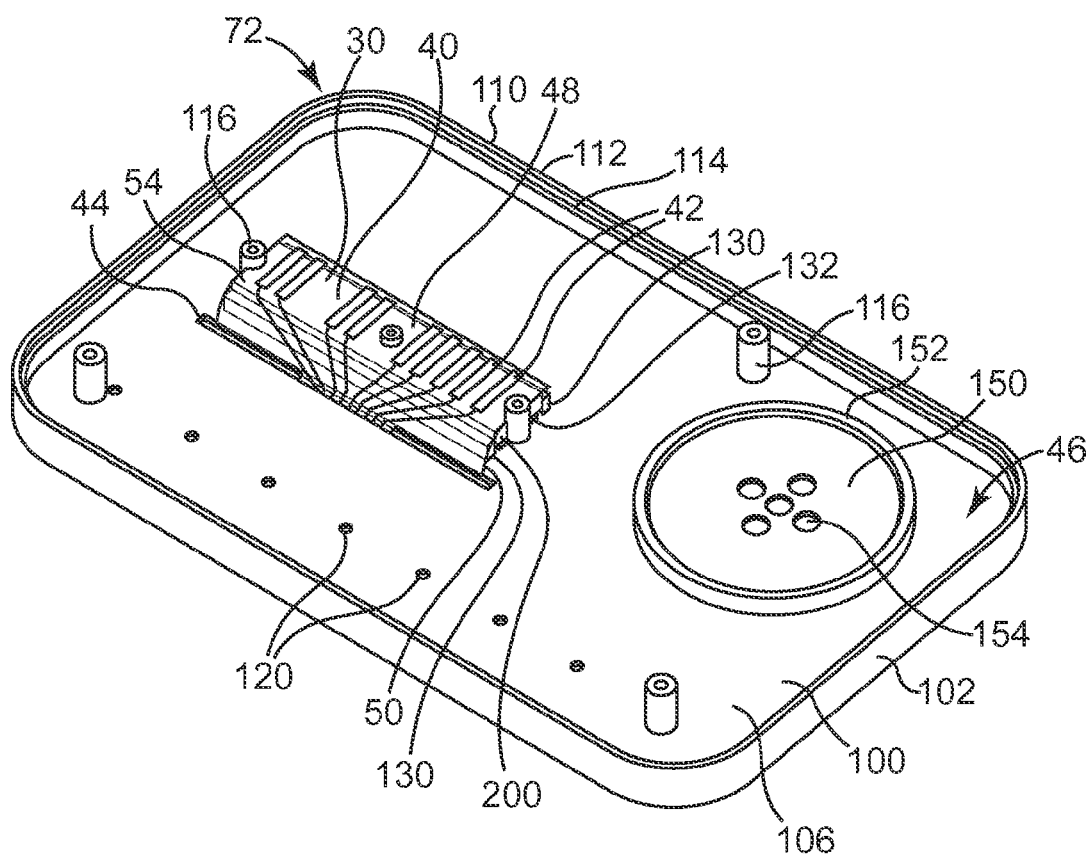
FIG. 8 is a perspective view illustration of the cover of FIG. 7 with a resilient member and a flexible circuit member, according to one embodiment of the present invention.
Figure 9:
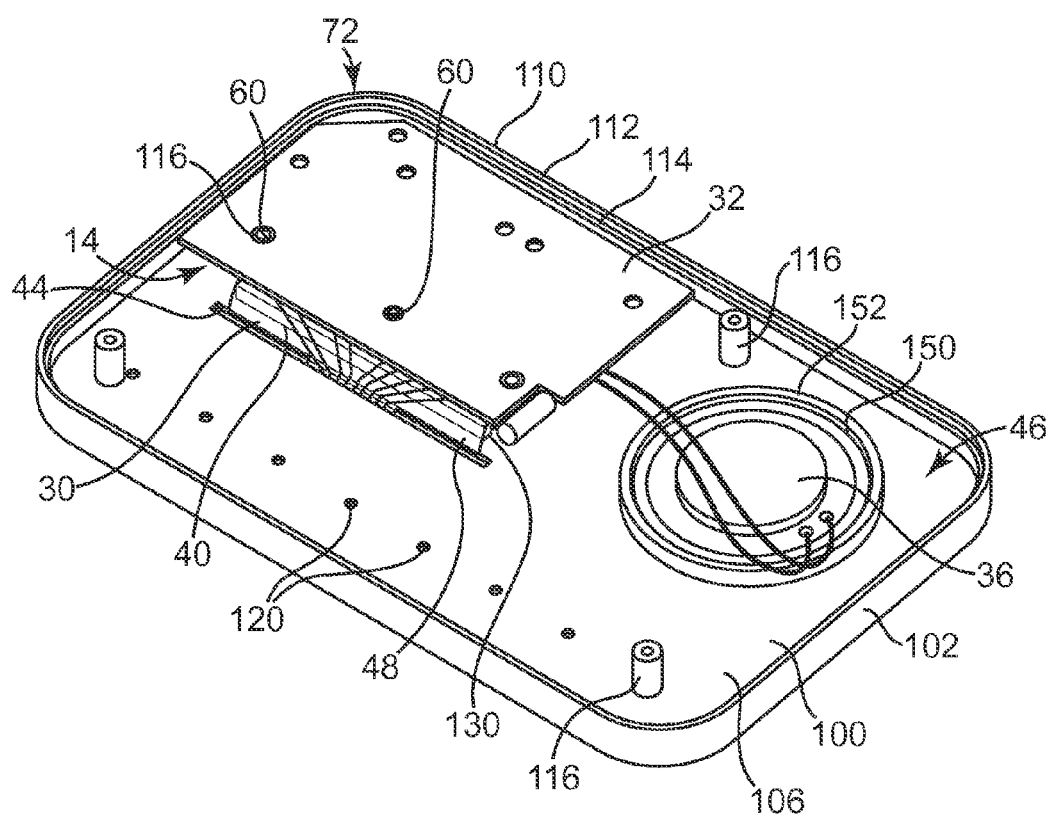
FIG. 9 is a perspective view illustration of the cover of FIG. 7 with an electrical circuit, according to one embodiment of the present invention.

Side wall 102 extends from primary panel 100 to collectively form an inside edge 110 opposite primary panel 100. In one embodiment, inside edge 110 is a stepped edge including a first portion 112 and a second portion 114 (FIGS. 7-9). In one embodiment, first portion 112 extends from primary panel 100 a further distance than second portion 114 extends from primary panel 100. First portion 112 extends around the perimeter of second portion 114. In this respect, inside edge 110 is formed as a stepped edge with lower, second portion 114 being positioned just inside higher, first portion 112. In one embodiment, the corners of inside edge 110 formed at corners of side walls 82, if any, are rounded or chamfered.

Figure 7:
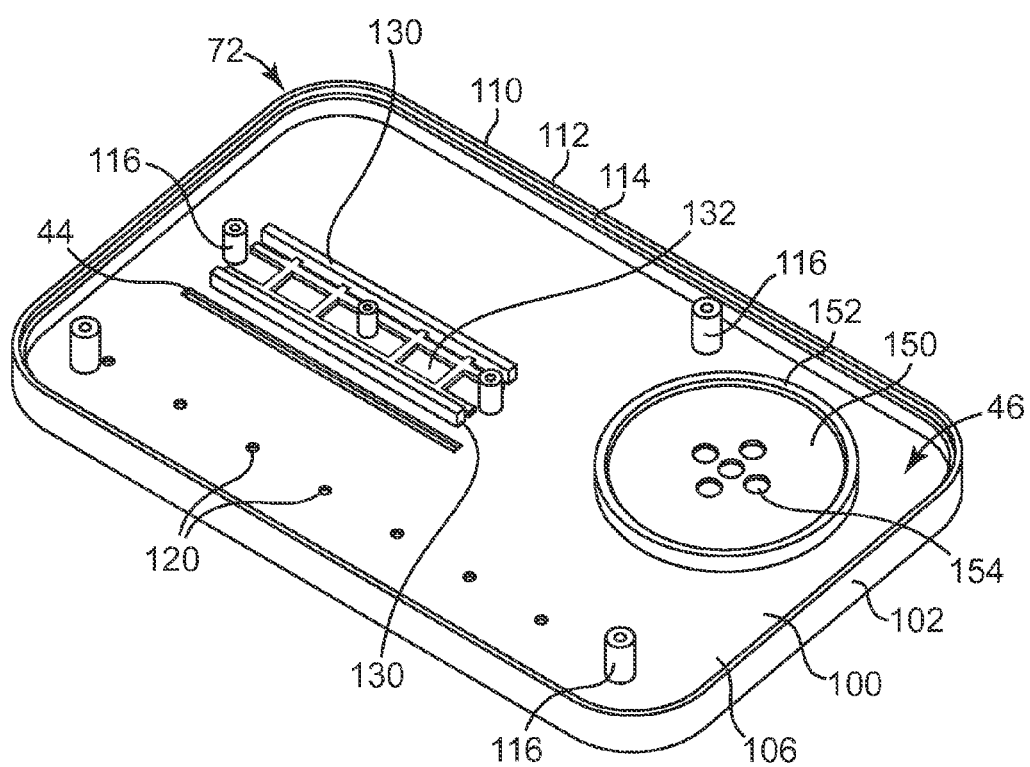
FIG. 7 is an inside perspective view illustration of a cover of the transaction product of FIG. 1, according to one embodiment of the present invention.

Referring to FIG. 7, in one example, cover 72 includes a plurality of protrusions 116 (e.g., substantially cylindrical protrusions) extending from inside surface 106 parallel to side wall 102. Some of protrusions 116 are positioned on cover 72 to generally align with cylindrical protrusions 96 of base 70 (FIG. 6) upon assembly of housing 12 to facilitate alignment and coupling of base 70 with cover 72. Others of protrusions 116 are configured to facilitate alignment and coupling with various components of electrical circuit 14 such as flexible circuit member 30 and PCB 32, as will be further described below.

In one embodiment, switch apertures 120 extend through primary panel 100. In one embodiment, each switch aperture 120 is positioned to align with one of switches 16 upon assembly of transaction product 10. In one example, switch apertures are arranged in a linear row near a side of cover 72. Switch apertures 120 serve to weaken or partially depress cover 72 partially inward (i.e., toward internal cavity 46) at areas near each switch aperture 120. Conductive members 122 (FIG. 6) are conductive and connected to housing 12, for example, outside surface 104 of cover 72. In one example, each conductive member 122 extends over a different one of switch apertures 120. Conductive members 122 are spaced from one another and are each sized similarly to or slightly larger than each switch 16 such that, upon assembly of transaction product 10, each conductive member 122 is configured to extend over a corresponding first contact member 56a and a corresponding second contact member 56b of a single pair of contact members 56. More specifically, each conductive member 122 is configured to selectively bridge a gap between a first contact member 56a and a second contact member 56b of a corresponding pair of contact members 56. Conductive members 122 are applied to outside surface 104 of cover 72 in any suitable manner such as by printing conductive ink, adhering a conductive member, or otherwise securing material forming conductive members 122 thereto.

In one embodiment, aperture 44, which was briefly mentioned above, is defined by cover 72 and is sized and shaped to receive flexible circuit member 30. More specifically, flexible circuit member 30 extends through aperture 44 such that external portion 52 is position external to internal cavity 46 of housing 12 (e.g., near outside surface 104 of cover 72), and internal portion 54 is positioned within cavity 46.

In one embodiment, cover 72 includes two internal walls 130 extending away from inside surface 106 of cover 72 with an orientation that, in one embodiment, is substantially parallel to an extension of side wall 102 from inside surface 106. In one example, the two internal walls 130 are slightly spaced from and run parallel to one another such that a small cavity or bed 132 is defined therebetween. In one embodiment, internal walls 130 are positioned near to aperture 44, and where aperture 44 is an elongated slot, run substantially parallel to aperture 44.

In one example, a speaker reception area 150 is defined by inside surface 106 of cover 72. In particular, in one embodiment, a rim 152 sized similar to or slightly larger than a speaker 36 (e.g., FIG. 6) of electrical circuit 14, which will be further described below, extends from inside surface 106 in a direction generally parallel to side wall 102. Rim 152 is configured to receive and/or at least partially surround speaker 36 upon assembly of transaction product 10 in a manner substantially fixing speaker 36 in place relative to cover 72.

In one example, at least one speaker aperture 154 is defined through primary panel 100 within speaker reception area 150. Each speaker aperture 154 is configured to facilitate transfer of sound from speaker 36 out of housing 12, and therefore, out of transaction product 10, during use. Although described above as being included in cover 72, in one embodiment, one or more of speaker reception area 150, rim 152 and the at least one speaker aperture 154 are defined at least in part by base 70.

In view of the above, outside surface 104 at least partially defines switch apertures 120 and the at least one speaker aperture 154. In addition, in one embodiment, a panel indentation 156 (FIG. 6) is defined on outside surface 104 of cover 72 and is sized and configured to receive a face panel 160 (FIG. 6) as will be further described below.

In one embodiment, each of base 70 and cover 72 is substantially rigid and is formed, for example, by injection molding plastic (e.g., polycarbonate, polystyrene, polyvinyl chloride (PVC), acrylonitrile butadiene styrene (ABS), polyethylene terephthalate (PET), teslin, polyactide (PLA) and acrylic) or other suitable material to define the various attributes of base 70 and cover 72. Other methods of forming base 70 and cover 72 are also contemplated. In one example, only one of base 70 and/or cover 72 may be included and/or serves as at least one support member of transaction product 10 that may or may not enclose any of electrical circuit 14.

In one embodiment, redemption indicia 162 (generally indicated with a dashed line box in FIG. 3) are included on transaction product 10, for example, on one or both of outside surface 84 of base 70 and outside surface 104 of cover 72. Redemption indicia 162 indicate that transaction product 10 is redeemable for the purchase of goods and/or services and that, upon use, a value of the purchased goods and/or services will be deducted from the financial account or record linked to transaction product 10. In one embodiment, redemption indicia 162 include phrases such as one or more of "<NAME OF STORE> GiftCard," "This GiftCard is not redeemable for cash or credit except where required by law" and "This GiftCard is redeemable for merchandise or services at any of our stores or at our web site," and/or provides help (e.g., provides balance information) or phone line information in case of a lost, stolen or damaged stored-value card, etc. In one embodiment, in which housing 12 is formed by injection molding, account identifier 20, redemption indicia 162 and one or more of any other indicia or information on transaction product 10 are printed onto outside surface 84 or outside surface 104 of housing 12.

Referring once again to FIGS. 1 and 6, a face panel 160 is optionally coupled to housing 12, for example to outside surface 104 of cover 72 within panel indentation 156. In one embodiment, face panel 160 is generally planar and is formed of paper, plastic or other suitable material. Face panel 160 includes a first, outer surface 170 and a second, inner surface 172 (FIG. 6). First, outer surface 170 includes indicia such as keyboard indicia 174, decorative indicia 176 and brand indicia 178. In one embodiment, second, inner surface 172 of face panel 160 is configured to interface with outside surface 104 of cover 72 within panel indentation 156. In one embodiment, face panel 160 is adhered to cover 72 with any suitable adhesive. In one embodiment, face panel 160 is formed on an adhesive backed plastic, paper, cardstock, etc. and is directly applied and adhered to cover 72.

Keyboard indicia 174 depict a linear row of keys 180 or user interfaces, which, in one embodiment, are depicted similar to a portion of a row of keys on a piano keyboard. Each key 180 may be differentiated from other keys 180 in any suitable manner, for example, with graphics, physical indentations, physical ribs, etc. In one embodiment, each key 180 is shaded a different color to facilitate correlation between notes in accompanying sheet music or a songbook (not shown) and keys 180. In one example, keys 180 are spaced from one another in a manner corresponding with the spacing of switches 16 on flexible circuit member 30. In one embodiment, face panel 160 is configured to be coupled with cover 72 such that keyboard indicia 174 extend over cover 72 in a manner aligning each key 180 with a different conductive member 122 as will be further described below. In view of the foregoing, keyboard indicia 174 with electrical circuit 14 provide one example of means for providing a piano-like interface on transaction product 10.

In one embodiment, decorative indicia 176 relate to a particular occasion (e.g., a wedding, new baby, graduation, holiday, or season) brand identifier, media format (e.g., a television show, movie, video game and/or book) or other visual design to promote purchase of transaction product 10. Brand indicia 178 identify a brand associated with transaction product 10 such as identifying a product brand, a store brand, department, etc.

Other combinations or selections of indicia to be displayed on face panel 160 are also contemplated. In an alternate embodiment, at least portions of indicia described to be included on face panel 160 are directly printed to outside surface 104 of cover 72 or to outside surface 84 of base 70 or vice versa. In one embodiment, first, outer surface 170 of face panel 160 is printed and finished in any one of a variety of manners such as dull, matte, gloss, textured or other effect finish.

In addition, in one embodiment, face panel 160 includes one or more apertures 190 extending through face panel 160. Each of the one or more apertures 190 is configured to generally align with a different one of speaker apertures 154 defined by cover 72. In this respect, sound coming from speaker 36 has a clear pathway through speaker apertures 154 of cover 72 and the one or more apertures 190 of face panel 160. Other combinations or selections of information or indicia to be displayed on face panel 160 are also contemplated.

During assembly of transaction product 10, flexible circuit member 30 is coupled with housing 12, for example, with cover 72. More specifically, referring to FIG. 6, in one embodiment, external portion 52 of flexible circuit member 30 is adhered or otherwise coupled to outside surface 104 of cover 72 such that each switch 16 of external portion 52 is aligned with and extends over a different conductive member 122 on cover 72. In this manner, upon movement of one of switches 16 toward the corresponding switch 16 (e.g., on user depression of the one of switches 16), first contact member 56a and second contact member 56b of switch 16 are both moved toward and eventually into contact with the corresponding conductive member 122.

More particularly, switches 16 and conductive members 122 are positioned such that when first contact member 56a and second contact member 56b are moved into contact with the corresponding conductive member 122, the spacing between first contact member 56a and second contact member 56b is bridged by conductive member 122, which closes a portion of electrical circuit 14 when electrical circuit 14 is fully assembled, as will be apparent to those of skill in the art upon reading this application. In one embodiment, first contact member 56a and second contact member 56b are at least partially biased away from conductive members 122 such that during periods of non-bearer interaction (i.e., when switches 16 are not being pressed or otherwise moved toward conductive members 122), first contact member 56a and second contact member 56b remain spaced from conductive members 122 such that that portion of electrical circuit 14 is not closed, and therefore, no associated note or tone is output by transaction product 10.

Referring to FIG. 6 in view of FIGS. 7 and 8, internal portion 54 of flexible circuit member 30 is thread through aperture 44 of cover 72 into internal cavity 46 of housing 12. In one embodiment, internal portion 54 of flexible circuit member 30 is coupled with cover 72. For example, in one embodiment, a resilient member 200 (e.g., a length of rubber or other suitable material) is placed in bed 132 between internal walls 130 of cover 72. In one example, resilient member 200 includes a semi-circular or other suitable cutout 202 at each of a first end 204 and a second end 206, which is longitudinally opposite first end 204, and a hole or aperture 208 longitudinally centered between first end 204 and second end 206. Upon placement of resilient member 200 in bed 132, each cutout 202 partially receives and aperture 208 fully receives one of protrusions 116 extending from inside surface 106 of cover 72 within or near to bed 132. This interaction serves to align and, in one embodiment, frictionally couple, resilient member 200 with cover 72.

Internal portion 54 of flexible circuit member 30 is folded to extend from aperture 44 at least partially over resilient member 200. In one example, internal portion 54 also includes cutouts 220 and a hole or aperture 222, which are similar to cutouts 202 and aperture 208. Upon placement of internal portion 54 of flexible circuit member 30 over resilient member 200, each cutout 220 partially receives and aperture 222 fully receives one of protrusions 116 extending from inside surface 106 of cover 72 within or near bed 132. In this manner, second surface 50 of internal portion 54 abuts resilient member 200, and first surface 48 of internal portion 54, which includes conductive pads 42, is positioned opposite resilient member 200 as illustrated in FIG. 8.

Upon securing flexible circuit member 30 to cover 72, the remainder of electrical circuit 14 is coupled with housing 12, more specifically, in one example, with cover 72. Referring to FIG. 6 in view of FIG. 9, PCB 32 is placed to extend over conductive pads 42 of flexible circuit member 30. More particularly, in one embodiment, PCB 32 is placed such that each contact pad 58 defined thereon is placed in direct contact with a different corresponding one of conductive pads 42. In one example, resilient member 200 serves to bias conductive pads 42 toward contact pads 58 to maintain substantially continuous contact between conductive pads 42 and contact pads 58. In one embodiment, placement of PCB 32 includes placement of PCB 32 such that apertures 60 defined therein receive protrusions 116, which, in one example, are the same protrusions 116 received by cutouts 202 and aperture 208 of resilient member 200 and cutouts 220 and aperture 222 of flexible circuit member 30 as described above. Upon placement of PCB 32, corresponding protrusions 116 may be capped or deformed to hold PCB 32 in place and to maintain flexible circuit member 30 interposed tightly between resilient member 200 and PCB 32.

Continuing to refer to FIG. 9, in one example, speaker 36 is positioned within speaker reception area 150 of cover 72. In particular, speaker 36 fits within rim 152 such that a front of speaker 36 is placed adjacent inside surface 106 of primary panel 100 of cover 72. As such, speaker 36 is also aligned with and positioned adjacent to speaker aperture(s) 154 as illustrated with additional reference to FIG. 7 or 8. Speaker 36 may additionally be adhered or otherwise coupled with cover 72 (e.g., with inside surface 106 and/or rim 152) and/or base 70. In other embodiments, electrical circuit 14 is at least partially positioned with respect to and/or coupled to base 70 rather than or in addition to cover 72.

Once electrical circuit 14 is assembled and coupled with a portion of housing 12 (e.g., cover 72), for example, as described above, base 70 is placed upon cover 72 or vice versa. In one embodiment, base 70 is placed on cover 72 such that inside edge 90 of base 70 interfaces with inside edge 110 of cover 72. More specifically, first portion 92 and second portion 94 of inside edge 90 interface with first portion 112 and second portion 114 of inside edge 110, respectively. The stepped interface provides for a stable and generally neat coupling of base 70 and cover 72. In one example, adhesive is applied between inside edge 90 and inside edge 110 to secure base 70 to cover 72 and/or cover 72 is ultrasonically welded or otherwise coupled with base 70 along inside edges 90 and 110. In one embodiment, upon coupling of base 70 with cover 72, cylindrical protrusions 96 (FIG. 6) of base 70 receive some of the plurality of protrusions 116 (FIG. 7-9) of cover 72. Other methods of securing base 70 to cover 72 are also contemplated.

Following securing of base 70 to cover 72, in one embodiment, second, inner surface 172 of face panel 160 is applied to outside surface 104 of cover 72. In particular, face panel 160 is fit and adhered within panel indentation 156 to generally align aperture(s) 190 of face panel 160 with the at least one speaker aperture 154 of cover 72. When aligned and placed on cover 72, face panel 160 also is adhered to or otherwise extends over external portion 52 of flexible circuit member 30 such that each key 180 defined by face panel 160 is generally aligned with a different corresponding one of switches 16. In this manner, pressure applied to one of keys 180 will be transferred to the corresponding switch 16 below, which causes a portion of electrical circuit 14 to be closed and a note to be played as described above. In other embodiments, face panel 160 is applied to cover 72 before assembling cover 72 with base 70 or prior to fully assembling electrical circuit 14.

Upon final assembly, transaction product 10 functions to both amuse consumers and/or recipients and to entice consumers to purchase transaction product 10. In particular, upon a consumer or recipient pressing face panel 160 in a position corresponding with one or more of keys 180, the corresponding portion of electrical circuit 14 is closed, which causes of electrical circuit 14 to output or play the corresponding audible note or tone. In particular, additionally referring to FIG. 6, interaction with a switch 16 via key 180 closes a portion of electrical circuit 14, thereby drawing current from the at least one power source 38, causing controller 34 to send an associate electrical impulse to speaker 36, which in turn plays a corresponding audible tone.

In one embodiment, for example, where the notes associated with keys 180, and, therefore, associated with switches 16, are the seven "natural" notes of the C-major scale, a user can press or otherwise interact with keys 180 in a sequence configured to play a song or at least a portion thereof. In one example, the user interacts with more than one key 180 near simultaneously to produce a chord, in which more than one audible note is emitted simultaneously and where the emitted notes corresponds with the ones of keys 180 impacted by the user. Accordingly, the customer and/or recipient are presented with both a product having transaction and audible functionality where the audible functionality is a source of amusement to the customer and/or recipient.

Figure 10:
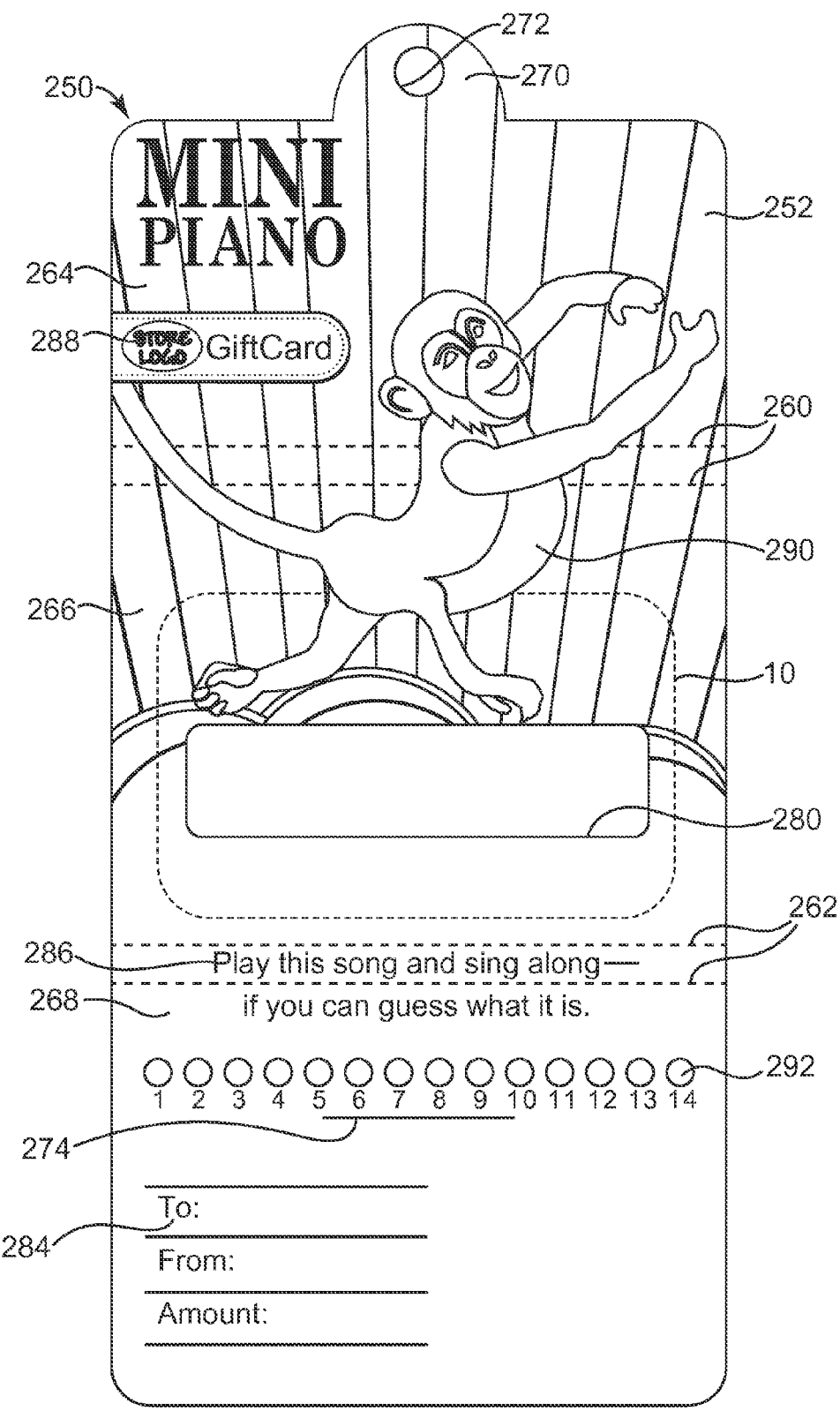
FIG. 10 is a front view illustration of a backer for a transaction product, according to one embodiment of the present invention.
Figure 11:
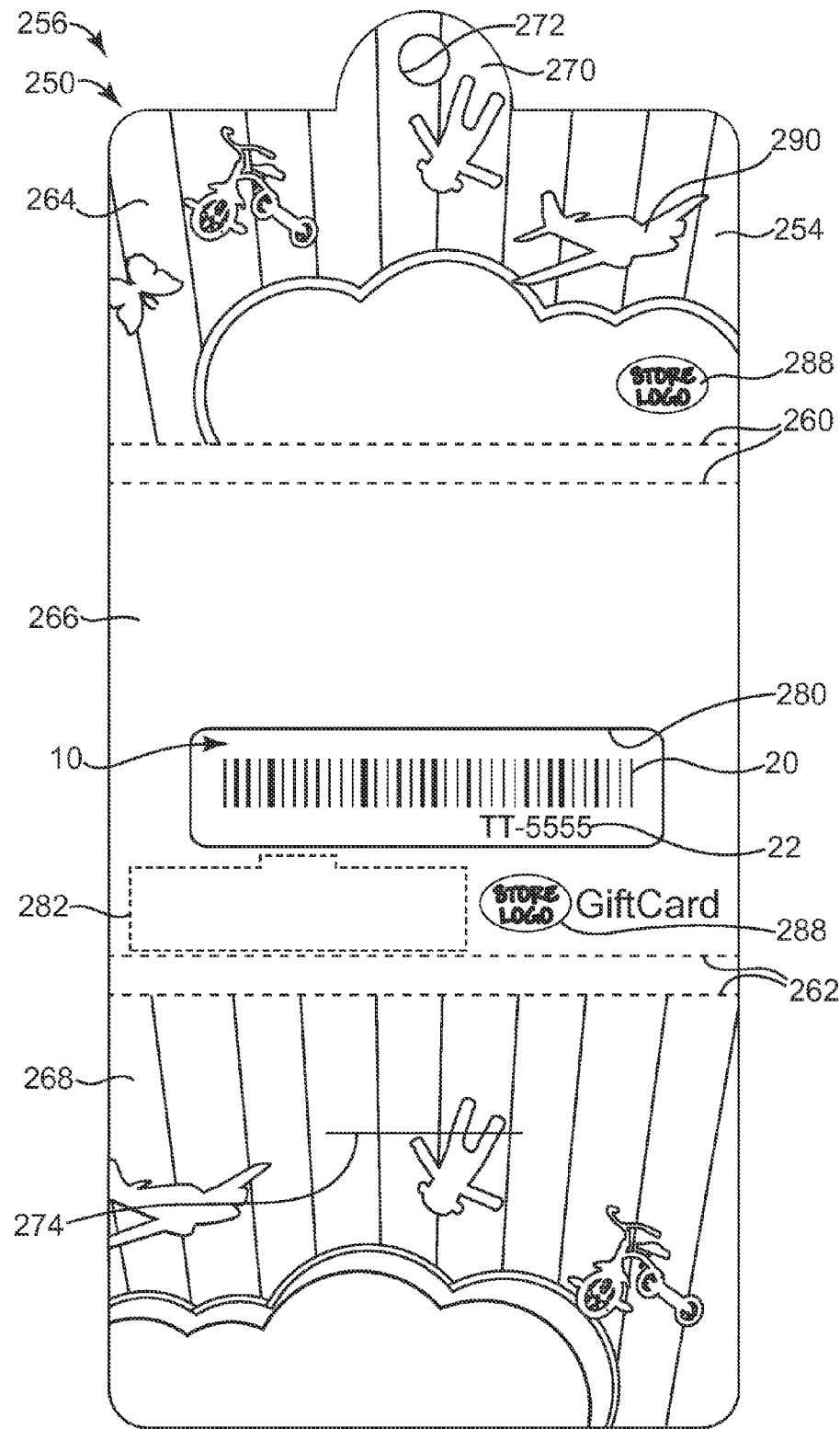
FIG. 11 is a rear view illustration of a transaction product assembly including the backer of FIG. 10 with the transaction product of FIG. 1, according to one embodiment of the present invention.

FIGS. 10 and 11 illustrate a carrier or backer 250 supporting transaction product 10 (FIGS. 1-6 and 11). Backer 250 comprises a single layer or multiple layers of paper or plastic material, for example, generally in the form of a relatively stiff but bendable/flexible card. Use of other materials is also contemplated. As such, backer 250 defines a first or front surface 252 (FIG. 10) and a second or rear surface 254 (FIG. 11). Transaction product 10, which is generally represented in phantom lines in FIG. 10 for illustrative purposes (e.g., to allow for full viewing of front surface 252), is readily releasably attached to backer 250, for example, by adhesive, blister packaging, overlying skinning material or the like, such that transaction product 10 with backer 250 collectively define a transaction product assembly 256.

Fold lines 260 and 262 each extend laterally across backer 250 and are spaced longitudinally from one another. A first panel 264, a second or intermediate panel 266 and a third panel 268 are defined by the position of fold lines 260 and 262. First panel 264 extends from fold lines 260 away from fold line 262. Second or intermediate panel 266 extends between fold lines 260 and 262. Third panel 268 extends from fold lines 260 in a direction opposite fold lines 262.

In one embodiment, a tab 270 is generally centered at a first lateral end of backer 250, for example, at an end of first panel 264 opposite fold lines 260. In one example, a support arm aperture 272 is defined within tab 270 and is configured to receive a support arm or hook during display of transaction product assembly 256. In other embodiments, rather than providing multiple fold lines 260, a single fold line 260 is provided. Similarly, in one embodiment, a single fold line 262 is provided as opposed to the multiple fold lines 262 illustrated in FIGS. 10 and 11. In one embodiment, a laterally extending slit 274 is laterally centered on third panel 268.

In one example, during display for sale, backer 250 remains in an unfolded position as illustrated in FIGS. 10 and 11. As such, an open (i.e., unfolded) backer 250 can be hung via aperture 272 on the support arm or hook for display in a retail setting. Following purchase, the bearer of transaction product assembly 256 can fold the front surfaces 252 of backer 250 toward each other about fold lines 260 and 262 to wrap backer 250 about transaction product 10. When folded, tab 270 is moved through slit 274 to maintain backer 250 in a folded position for presentation of transaction product 10 by the consumer to a recipient. Other suitable backers will be apparent to those of skill in that art upon reading this application and may or may not be configures to fold or wrap about transaction product 10.

In one embodiment, backer 250 includes a window or opening 280 for displaying account identifier 20 of transaction product 10 through backer 250 as illustrated in FIG. 11. As previously described, account identifier 20 is adapted for accessing an account or record associated with transaction product 10 for activating, loading or debiting value from the account or record. Accordingly, in one embodiment, opening 280 allows access to account identifier 20 to activate and/or load transaction product 10 without removing transaction product 10 from backer 250. In one example, opening 280 is defined on intermediate panel 266 such that account identifier 20 can be accessed therethrough whether backer 250 is folded or unfolded.

In one embodiment, backer 250 displays indicia, graphics or text information including store logo(s), store name(s), slogans, advertising, instructions, directions, brand indicia, promotional information, holiday indicia, seasonal indicia, media format identifiers, characters and/or other information. The various indicia may be included on one or more of front surface 252 and rear surface 254. In one example, the indicia include one or more of redemption indicia 282, message field indicia 284, instructional indicia 286, brand indicia 288, decorative indicia 290, etc.

Redemption indicia 282 (generally indicated with a dashed line box in FIG. 11) inform a bearer of transaction product assembly 256 that transaction product 10 is redeemable for the purchase of goods and/or services and that upon use, a value of the purchased goods and/or services will be deducted from the financial account or record linked to transaction product 10. In one embodiment, redemption indicia 282 include phrases such as "<NAME OF STORE> GiftCard" and "This GiftCard is redeemable for merchandise or services at any of our stores or at our website," and/or provides help or phone line information in case of a lost, stolen or damaged transaction product 10, etc.

Message field indicia 284 (FIG. 10), for example, include "to," "from" and "amount" fields and are configured to be written to by the bearer of transaction product assembly 256 prior to presenting transaction product assembly 256 to a recipient. As such, message field indicia 284 facilitate the consumer in preparing transaction product assembly 256 for gifting to a recipient.

Instructional indicia 286 (FIG. 10) include directions to bearer of transaction product 10 regarding how to use the audio functionality of transaction product 10. For example, instructional indicia 286 may instruct a user to play a song using transaction product 10. More specifically, in one embodiment, instructional indicia 286 include notation 292 of a sequence of notes that collectively make up a readily identifiable song or melody. For example, the notes may be in the form of conventional sheet music notes, may each be a color corresponding with a color of a specific one of keys 180, may each be a number or other identifier associated with keys 180 such that even a musical novice is able to play the song or melody using transaction product 10.

Brand indicia 288 identify a store, brand, department, etc. and/or services associated with transaction product 10. Any decorative indicia 290, which may be similar to or coordinate with indicia of transaction product 10, may also be included on backer 250. Any of indicia 282, 284, 286, 288, 290 or other indicia optionally may appear anywhere on backer 250 or transaction product 10. Additional information besides that specifically described and illustrated herein may also be included.

Figure 12:
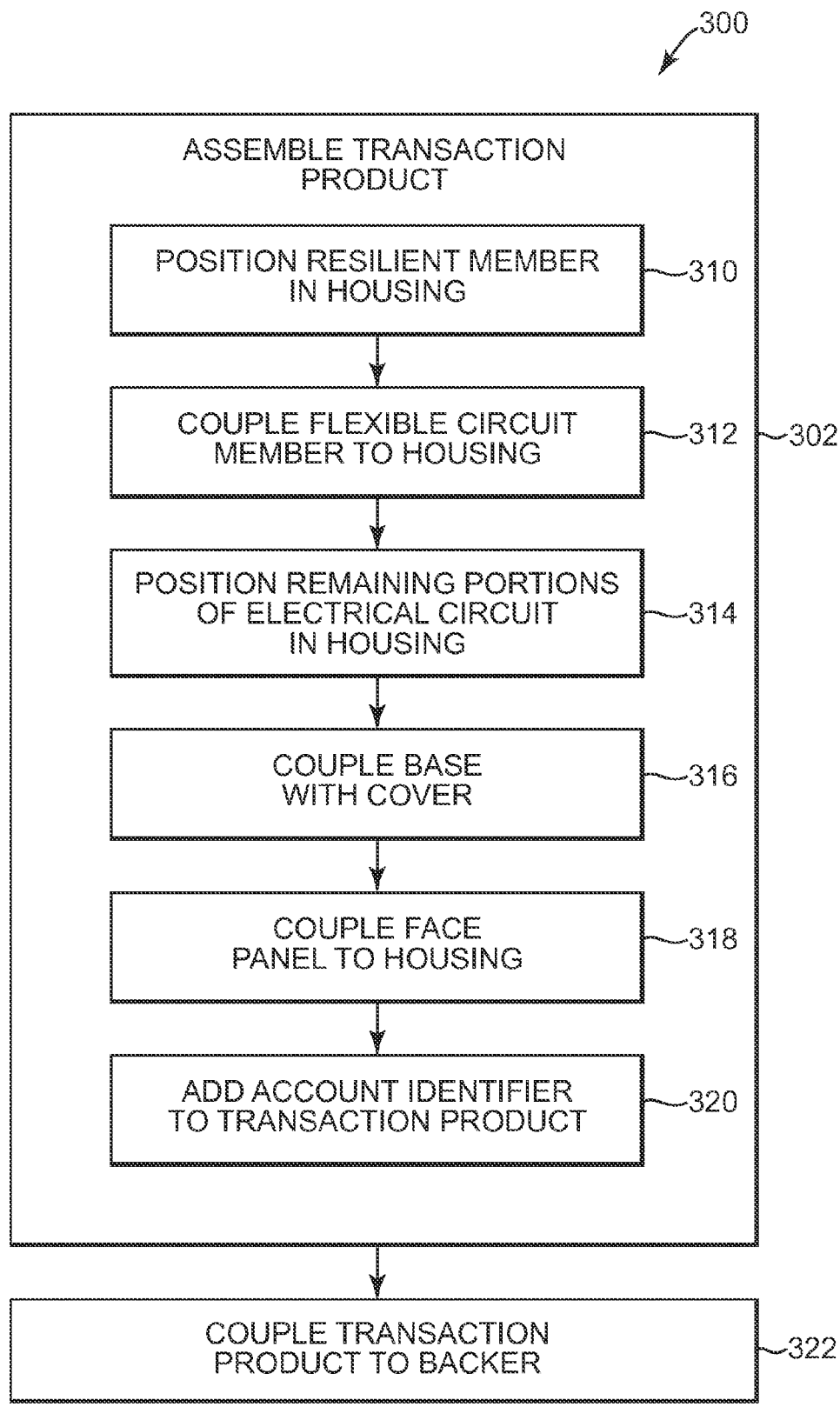
FIG. 12 is a flow chart illustrating a method of assembling the transaction product of FIG. 1, according to one embodiment of the present invention.

FIG. 12 is a flow chart illustrating one embodiment of a method 300 of assembling transaction product 10. For example, at 310, resilient member 200 is placed in bed 132 of housing 12, more particularly, of cover 72. At 312, flexible circuit member 30 is coupled with cover 72 such that switches 16 of flexible circuit member 30 align with conductive members 122 on outside surface 104 of cover 72 and conductive pads 42 of flexible circuit member 30 are positioned within internal cavity 46 of housing 12 as described above.

At 314, the remaining portions of electrical circuit 14 are positioned in housing 12. For instance, PCB 32 is positioned with respect to and coupled with cover 72 such that contact pads 58 each directly contact or are otherwise placed in electrical communication with a corresponding one of conductive pads 42. For example, PCB 32 may be positioned to tightly interpose conductive pads 42 of flexible circuit member 30 between resilient member 200 and contact pads 58 of PCB 32. In one example, speaker 36 is placed in speaker reception area 150.

At 316, base 70 and cover 72 are coupled to one another. In one instance, inside edge 90 of base 70 is positioned to abut and be secured to inside edge 110 of cover 72 as described above. Other methods of coupling base 70 and cover 72 are also contemplated as are alternative housings 12 or support members that may not include base 70 and/or cover 72. In one embodiment, at 318, face panel 160 is coupled to cover 72 to extend over external portion 52 of flexible circuit member 30 to cover 72 such that each key 180 of face panel 160 aligns with a different one of switches 16.

At 320, account identifier 20 is added to housing 12, if account identifier is not already part of transaction product 10. Although illustrated in FIG. 2 as occurring after all of operations 310, 312, 314, 316 and 318, it should be understood that account identifier 20 may be applied to housing 12 or any portion thereof at any suitable time during manufacturing and assembly thereof. For example, account identifier 20 may be molded into or otherwise integrally formed as part of housing 12, may be enclosed within housing 12 and/or may be printed or otherwise applied to housing 12 before or after one or more of operations 310, 312, 314, 316 and 318 as will be apparent to those of skill in the art upon reading this application. Other suitable sequences of performing operations 310, 312, 314, 316, 318 and 320 will be apparent to those of skill in the art upon reading the present application.

At 322, transaction product 10 is coupled with backer 250 as generally illustrated with additional reference to FIGS. 10 and 11 to form transaction product assembly 256. Transaction product 10 may be adhered, skinned to, blister packed with or otherwise suitably coupled with backer 250. In one embodiment, account identifier 20 of transaction product 10 is accessible for scanning while transaction product 10 is coupled with backer 250, for example, through opening 280 in backer 250. In one embodiment, additional sheets of music (not shown) configured to assist the bearer of transaction product 10 in playing songs or melodies using transaction product 10 are also coupled to or otherwise as a part of transaction product assembly 256.

Figure 13:
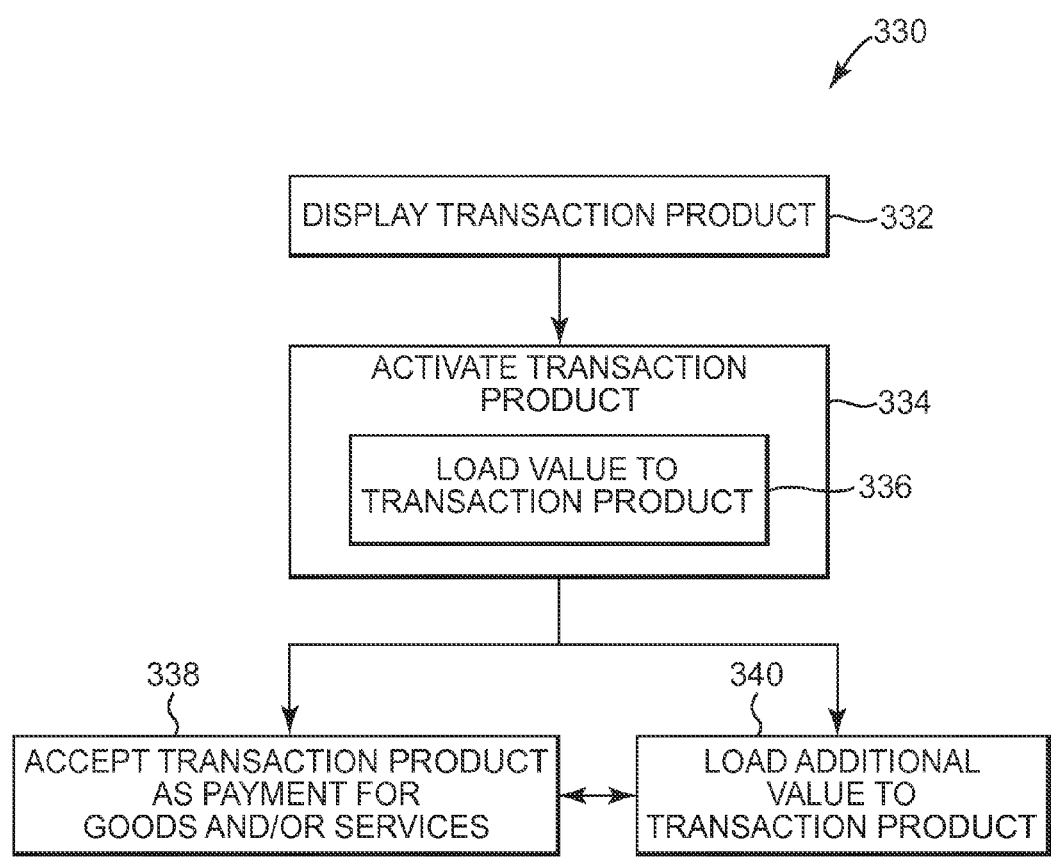
FIG. 13 is a flow chart illustrating a method of encouraging purchase and facilitating use of a transaction product, according to one embodiment of the present invention.

FIG. 13 is a flow chart illustrating one embodiment of a method 330 of encouraging purchase and facilitating use of transaction product 10 by consumers and/or recipients. At 332, transaction product 10 or, in one embodiment, transaction product assembly 256 is placed on or hung from a rack, shelf or other similar device to display transaction product 10 for sale to potential consumers, for example, via aperture 272 (FIGS. 10 and 11). In one embodiment, a depiction of transaction product 10 is placed on a web site for viewing and purchase by potential consumers. In one example, display of transaction product 10 includes advertising the piano-like functionality of transaction product 10 to encourage consumer purchase of transaction product 10, for example, in the form of indicia 282, 284, 286, 288, 290, etc.

At 334, a consumer who has decided to purchase transaction product 10 presents transaction product 10 on backer 250 to a retail store employee, retail store kiosk, remote terminal or other person or device to scan account identifier 20 to access an account or record linked to account identifier 20. In particular, account identifier 20 is scanned or otherwise accessed, for example through opening 280 of backer 250 to activate transaction product 10. Upon accessing the account or record, then, at 336, value is added to the account or record in the form of monetary value, points, minutes, etc. Thus, transaction product 10 is activated and loaded.

In one example, a predetermined value is associated with transaction product 10 (i.e., associated with the account or record linked to transaction product 10 via account identifier 20) prior to activation and display of transaction product 10, but such predetermined value is not initially available for use toward the purchase or use of goods and/or services. In such an embodiment, at 334, transaction product 10 is activated to permit subsequent access to the predetermined value (e.g., subsequent loading on and debiting from the account or record) and no additional value is added during activation such that operation 336 may be eliminated.

Once transaction product 10 is activated and loaded, transaction product 10 can be used by the consumer or any other bearer of transaction product 10 to purchase goods and/or services at the affiliated retail setting (e.g., a retail store or web site) or can be used in exchange for calling minutes, etc. In one embodiment, where transaction product 10 is displayed on a web site at 332, then, at 334, transaction product 10 may be activated in any suitable method and may not require the physical scanning of account identifier 20 to be activated or to otherwise access the associated account or record such as at 336.

In one example, at 338, the retail store or other affiliated retail setting or web site accepts transaction product 10 as payment towards the purchase of goods and/or services made by the current bearer of transaction product 10. In particular, the value currently loaded on transaction product 10 (i.e., stored or recorded in the account or record linked to account identifier 20) is applied toward the purchase of goods and/or services. At 340, additional value is optionally loaded on transaction product 10 at a point-of-sale terminal, kiosk or other area of the retail store, retail web site, or other related setting.

Upon accepting transaction product 10 as payment at 338, the retail store or related setting can subsequently perform either operation 338 again or operation 340 as requested by a current bearer of transaction product 10. Similarly, upon loading additional value on transaction product 10 at 340, the retail store or related setting can subsequently perform either operation 340 again or operation 338. In one example, the ability to accept transaction product 10 as payment for goods and/or services is limited by whether the account or record associated with transaction product 10 has any value stored or recorded therein at the time of attempted redemption.

FIG. 14 is a flow chart illustrating one embodiment of a method 360 of using transaction product 10 (e.g., FIGS. 1-6). At 362, a potential consumer of transaction product 10, which is displayed in a retail store or viewed on a web site, decides to and does purchase transaction product 10 from the retail store or web site. It should be understood that transaction product 10 can be displayed and purchased alone or as part of transaction product assembly 256 (FIG. 11) along with backer 250.

Upon purchasing transaction product 10, a retail store employee, a retail store kiosk or other person or device scans account identifier 20 (FIGS. 3 and 11), for example, through opening 280 of backer 250 or otherwise reads or accesses account identifier 20. Upon accessing account identifier 20, the account or record linked to account identifier 20 is accessed and activated to load value onto transaction product 10 (i.e., load value to the account or record associated with transaction product 10). In one embodiment, such as where transaction product 10 is purchased at 362 via a web site, actual scanning or other mechanical detection of account identifier 20 may be eliminated and/or manual input of code 22 may be added.

At 364, the consumer optionally gives transaction product 10 to a recipient, such as a graduate, relative, friend, expectant parents, one having a recent or impending birthday, a couple having a recent or impending anniversary, etc. In one embodiment, a plurality of transaction products 10 are purchased and given to party goers, such as at a birthday party, etc. as party favors or gifts. As an alternative, the consumer can keep transaction product 10 for his or her own use thereby eliminating operation 364.

At 366, the consumer, recipient or other current bearer of transaction product 10 interacts with the audio functionality of transaction product 10. In one embodiment, playing or otherwise interacting with transaction product 10 at 366 includes interacting with keys 180 individually or in a sequence to play a song or melody using transaction product 10. More specifically, each bearer interaction with one of keys 180 activates a corresponding switch 16 to close a portion of electrical circuit 14, which, in turn, causes one of a plurality of notes to be played. Each key 180 corresponds with a different note, such that user interaction with any of keys 180 produces an expected note to be audible played via speaker 36. In one embodiment, two or more keys 180 may be pressed or otherwise interacted with substantially simultaneously such that multiple audio notes are played substantially simultaneously to product a chord. As such, user interaction with the audio features of transaction product 10 simulates user interaction with at least a portion of a piano.

In one example, interacting with the audio functionality of transaction product 10 includes playing a song or a portion thereof. In one embodiment, a bearer is assisted in playing a song or portion thereof by referring to instructional indicia 286 on backer 250 or another source. In one embodiment, rather than providing the notes to be played, where keys 180 are each shaded a different color, instructional indicia 286 provide a sequence of colors configured to instruct a bearer of transaction product 10 to interact with keys 180 in an order corresponding with the sequence of colors to play a readily identifiable song or melody.

At 368, the consumer or recipient redeems transaction product 10 for goods and/or services from the retail store or web site. At 370, the consumer or recipient of transaction product 10 optionally adds value to transaction product 10, more particularly, to the account or record associated with account identifier 20 included therewith, at the retail store or over the Internet (i.e., via the web site). Upon interaction with transaction product 10 at 366, redeeming transaction product 10 at 368 or adding value to transaction product 10 at 370, the consumer or recipient of transaction product 10 subsequently can perform either of operations 366, 368 or 370 as desired. In one embodiment, the ability of the consumer or recipient to repeat redeeming transaction product 10 at 370 is limited by whether the account or record linked with transaction product 10 has any remaining value stored or recorded therein at the time of attempted redemption.

Although primarily described above as occurring at a single retail store or web site, in one embodiment, purchasing transaction product 10 at 362, redeeming transaction product 10 at 368 and adding value to transaction product 10 at 370, can each be performed at any one of a number of stores adapted to accept transaction product 10 or over the Internet. In one example, each of the number of stores is part of a chain or a group of similarly branded stores. In one example, a number of stores include at least one web site and/or at least one conventional brick and mortar store.

Transaction products come in many forms, according to embodiments of the invention. The gift card, like other transaction products, can be "re-charged" or "re-loaded" at the direction of the original consumer, the gift recipient or a third party. The term "loading on" or "loaded on" herein should be interpreted to include adding to the balance of an account or record associated with a transaction product. The balance associated with the transaction product declines as the transaction product is used, encouraging repeat visits or use. The transaction product remains in the user's purse or wallet, serving as an advertisement or a reminder to revisit the associated merchant. Gift cards according to embodiments of the invention provide a number of advantages to both the consumer and the merchant. Other transaction products according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are for illustrative purposes only and should not be considered to limit the invention. Various alternatives and other modifications within the scope of the invention in its various embodiments will be apparent to those of ordinary skill.

What is claimed is:

1. A transaction product, comprising:
    an enclosure including an external surface, an internal cavity within the enclosure, and an aperture providing external access to the internal cavity;
    an electrical circuit including a flexible circuit member, the flexible circuit member including a first portion, a second portion opposite the first portion, and electrically connective traces included on and extending between the first portion and the second portion, wherein:
        the flexible circuit member and the electrically connective traces of the flexible circuit member extend through the aperture defined by the enclosure,
        the first portion of the flexible circuit member is coupled to the external surface of the enclosure, and
        the second portion of the flexible circuit member is positioned within the internal cavity of the enclosure; and
    an account identifier that is at least one of connected to or enclosed within the enclosure, wherein:
        the account identifier is machine readable and links the transaction product to a financial account, and
        the financial account tracks a monetary value available as tender toward at least one purchase of one or more of goods and services using the account identifier of the transaction product.

2. The transaction product of claim 1, wherein the account identifier is a bar code fixedly connected to the external surface of the enclosure.

3. The transaction product of claim 2, wherein:
    the external surface includes a first face and a second face opposite the first face,
    the first portion of the flexible circuit member is coupled to the first face of the external surface, and the account identifier is fixedly connected to the second face of the external surface.

4. The transaction product of claim 1, wherein the account identifier includes at least one of a bar code, a magnetic strip, and a radio frequency identification (RFID) device.

5. The transaction product of claim 1, wherein:
the second portion of the flexible circuit member includes a plurality of conductive pads;
the first portion of the flexible circuit member includes one or more electrical switches each in electrical communication via the electrically connective traces with a different one of the plurality of conductive pads and a common one of the plurality of conductive pads;
the plurality of conductive pads are maintained within the internal cavity of the enclosure; and
the one or more electrical switches are maintained external to the enclosure.

6. The transaction product of claim 5, wherein:
the one or more electrical switches is a plurality of electrical switches each positioned in a linear row,
the electrical circuit associates each of the plurality of electrical switches with a different corresponding one of a plurality of audible tones, and
the electrical circuit includes a speaker configured to play ones of the plurality of audible tones corresponding with ones of the plurality of electrical switches triggered via user interaction with the transaction product.

7. The transaction product of claim 5, further comprising a substantially planar panel defining a plurality of keys, wherein:
the one or more electrical switches is a plurality of electrical switches each corresponding with a different output by the electrical circuit,
the substantially planar panel is applied over at least a portion of the external surface of the enclosure,
each one of the plurality of keys of the substantially planar panel is positioned to extend over a different corresponding one of the plurality of electrical switches, and
upon user interaction with one of the plurality of keys, the different corresponding one of the plurality of electrical switches is closed to activate the electrical circuit to produce the different output corresponding with the one of the plurality of keys.

8. The transaction product of claim 7, in combination with a carrier releasably coupled to and supporting the enclosure, wherein:
the different output is a different audio output, and
the carrier includes instructional indicia depicting a sequence for a user of the transaction product to interact with the plurality of keys to play a melody with the transaction product, the melody including the different audio output.

9. The transaction product of claim 5, wherein:
the electrical circuit includes:
a printed circuit board including a plurality of contact pads,
a controller in electrical communication with the plurality of contact pads, and
a speaker electrically coupled with the controller, and
each of the plurality of conductive pads of the flexible circuit member is placed in electrical contact with a different one of the plurality of contact pads.

10. The transaction product of claim 5, wherein:
the external surface of the enclosure includes statically positioned conductive members, and
each of the one or more electrical switches is positioned to selectively electrically interact with a different one of the statically positioned conductive members upon user-induced movement of a corresponding part of the first portion of the flexible circuit member.

11. The transaction product of claim 5, further comprising a face panel extending over at least a portion of the external surface of the enclosure and the first portion of the flexible circuit member in a manner covering an entirety of each of the one or more electrical switches.

12. The transaction product of claim 1, wherein:
the enclosure defines a first primary panel, a second primary panel positioned opposite and spaced from the first primary panel, and a side wall extending from the first primary panel to the second primary panel,
the first primary panel defines a first face of the external surface and the aperture, and
the first portion of the flexible circuit member is coupled to the first face.

13. The transaction product of claim 1, wherein:
the enclosure is substantially rigid and formed of injection molded plastic, and
the aperture is an elongated slot defined through the enclosure and providing access to the internal cavity.

14. The transaction product of claim 1, wherein the flexible circuit member is folded to extend through the aperture such that the first portion of the flexible circuit member and the second portion of the flexible circuit member extend substantially parallel to and offset from each other separated by a portion of the enclosure.

15. The transaction product of claim 14, wherein the portion of the enclosure extends substantially parallel to the first portion of the flexible circuit member and the second portion of the flexible circuit member.

16. The transaction product of claim 1, in combination with a remote database storing the financial account.

17. A stored-value product comprising:
an electrical assembly including:
means for providing a plurality of flexible electrical connectors including an external portion and an internal portion positioned opposite the external portion, wherein the plurality of flexible electrical connectors extend along and between each of the external portion and the internal portion, and
means for generating a plurality of outputs each discernable by a bearer of the stored-value product, wherein the means for generating is controlled at least partially by electrical signals received via the plurality of flexible electrical connectors;
user-accessible means for interacting with the external portion of the means for providing the plurality of flexible electrical connectors to initiate generation of one or more of the plurality of outputs from the electrical assembly, wherein the means for providing the plurality of flexible electrical connectors extends between the user-accessible means for interacting and the means for generating;
means for enclosing the internal portion of the means for providing the plurality of flexible electrical connectors, wherein:
the means for enclosing includes an elongated slot and defines an exterior surface,
the external portion of the means for providing the plurality of flexible electrical connectors is coupled to the exterior surface of the means for enclosing, and
the means for providing the plurality of flexible electrical connectors extends through the elongated slot as the means for providing the plurality of flexible electrical connectors transitions between the internal portion and the external portion; and means for linking the stored-value product with an account having a monetary value associated therewith such that the stored-value product can be used as payment toward one of a purchase and a use of one or more of goods and services, wherein the means for linking is at least one of coupled to and enclosed within the means for enclosing.

18. The stored-value product of claim 17, wherein:

the internal portion of the means for providing the plurality of flexible electrical connectors includes a plurality of conductive pads each positioned at a first end of one of the plurality of flexible electrical connectors, the external portion of the means for providing the plurality of flexible electrical connectors includes one or more electrical switches at a second end of one of the plurality of flexible electrical connectors, each of the one or more electrical switches corresponds with and is configured to instruct the means for generating to generate a different one of the plurality of outputs, and the internal portion and the external portion of the means for providing the plurality of flexible electrical connectors are positioned to extend at least partially in parallel with one another spaced by a portion of the means for enclosing.

19. The stored-value product of claim 18, wherein:

the user-accessible means for interacting with the external portion of the means for providing the plurality of flexible electrical connectors includes means for covering the one or more electrical switches and at least a portion of the exterior surface of the means for enclosing, the means for covering indicates a plurality of different input areas for bearer interaction, and each of the plurality of different input areas corresponds with a different one of the one or more electrical switches such that bearer interaction with one of the plurality of different input areas results in triggering the corresponding different one of the one or more electrical switches, which, in turn, initiates the means for generating to create a corresponding one of the plurality of outputs.

20. A transaction product comprising:

an electrical assembly including:

a flexible circuit member providing a plurality of flexible electrical connectors and including an external portion and an internal portion positioned opposite the external portion, wherein the plurality of flexible electrical connectors extend along and between each of the external portion and the internal portion of the flexible circuit member, and means for generating a plurality of outputs each discernable by a bearer of the transaction product, wherein the means for generating is controlled at least partially by electrical signals received via the plurality of flexible electrical connectors;

a plurality of keys interacting with the external portion of the flexible circuit member to initiate generation of one or more of the plurality of outputs from the electrical assembly, wherein the flexible circuit member extends between the plurality of keys and the means for generating;

an enclosure including an external surface, an internal cavity, and an elongated slot, wherein:

the enclosure houses the internal portion of the flexible circuit member, the external portion of the flexible circuit member is coupled to the external surface of the enclosure, and the flexible circuit member extends through the elongated slot of the enclosure as the flexible circuit member extends between the internal portion and the external portion; and an account identifier linking the transaction product with a financial account having a monetary value associated therewith such that the transaction product can be used as payment toward one of a purchase and a use of one or more of goods and services, wherein the account identifier is at least one of coupled to and enclosed within the enclosure.

\* \* \* \* \*